(12) United States Patent
Van Ieperen

(10) Patent No.: US 6,326,954 B1
(45) Date of Patent: Dec. 4, 2001

(54) METHOD FOR ERASING ON AN ELECTRONIC WRITEBOARD

(75) Inventor: Taco Van Ieperen, Calgary (CA)

(73) Assignee: Smart Technologies, Inc., Calgary (CA)

( * ) Notice: Subject to any disclaimer, the term of this patent is extended or adjusted under 35 U.S.C. 154(b) by 0 days.

(21) Appl. No.: 09/285,673

(22) Filed: Apr. 5, 1999

Related U.S. Application Data

(60) Provisional application No. 60/080,805, filed on Apr. 6, 1998.

(51) Int. Cl.[7] ........................................ G09G 5/00
(52) U.S. Cl. ..................... 345/173; 345/179; 178/18.01; 178/18.03
(58) Field of Search .................................. 345/173–183, 345/104; 178/18.01–18.11; 1/19.01–19.07

(56) References Cited

U.S. PATENT DOCUMENTS

| Re. 33,936 | * | 5/1992 | Miyamori et al. | 178/18 |
| 4,777,329 | * | 10/1988 | Mallicoat | 178/18 |
| 5,529,501 | * | 6/1996 | Maruyama | 434/408 |

* cited by examiner

Primary Examiner—Lun-Yi Lao
(74) Attorney, Agent, or Firm—Katten Muchin Zavis

(57) ABSTRACT

A method for erasing writing on an electronic writeboard includes the steps of describing an eraser as a mask and monitoring movement of the eraser over the electronic writeboard. When the mask overlaps with writing on the electronic writeboard, erasing of the writing within the mask is performed. The shape of the mask is adjusted to compensate for the speed at which the eraser is moved over the electronic writeboard.

17 Claims, 3 Drawing Sheets

METHOD FOR ERASING ON AN ELECTRONIC WRITEBOARD

This application claims the benefit of Provisional No. 60/080,805 filed Apr. 6, 1998.

FIELD OF THE INVENTION

The present invention relates to electronic writeboards and in particular to a method and editor for erasing on an electronic writeboard.

BACKGROUND OF THE INVENTION

Electronic writeboards or whiteboards (EWBs) are known in the art and have been used in conjunction with host computers executing applications software to provide enhanced multimedia and teleconferencing capabilities. An example of an electronic writeboard of this nature is sold by SMART Technologies Inc. of Calgary, Alberta, Canada under the name SMART Board. The SMART Board electronic writeboard includes a touch sensitive panel, a tool tray accommodating a plurality of tools such as coloured pens and an eraser as well as a driver and an associated controller.

In use, the electronic writeboard is connected to a host processor such as a personal computer operating in a Windows® environment and executing applications software, via a serial data connection. The electronic writeboard can be operated in one of three modes, namely a projected mouse mode, a projected mark-up mode and a non-projected mode.

In the projected mouse mode, the image displayed on the monitor of the personal computer is projected onto the touch sensitive panel. In this case, the electronic writeboard functions as a giant mouse providing input to the personal computer in response to user contact with the touch sensitive panel. Specifically, the electronic writeboard generates mouse events in response to user contact with the touch sensitive panel, which are conveyed to the personal computer for processing. Thus, by contacting the touch sensitive panel, the personal computer can be conditioned to open and display menus, to activate displayed menus, to drag icons, to execute software and to switch applications by changing input focus. The latter event of course is achieved by contacting the touch sensitive panel outside of the window of the active application running on the personal computer.

In the projected mark-up mode the coloured pens and eraser are used to contact the touch sensitive panel. The active application running on the personal computer tracks where writing and erasing has occurred and maintains a computerized image of what is drawn on and erased from the touch sensitive panel. The computerized image includes one or more objects, each of which represents writing on the touch sensitive panel. The computerized image is projected onto the touch sensitive panel so that the user can see the computerized image.

In the non-projected mode, no images are displayed on the touch sensitive panel. Dry-erase markers are used to contact the touch sensitive panel. The application running on the personal computer tracks where writing and erasing has occurred and maintains a computerized image of what is drawn on the touch sensitive panel. However, since no image is displayed on the touch sensitive panel, the electronic writeboard is not interactive when operated in this mode.

Currently there are two prior art erasing techniques used in electronic writeboards during operation in the projected mark-up mode. One technique is to detect when the eraser touches an object representing writing that is displayed on the electronic writeboard and delete the entire object touched by the eraser. This approach is unsatisfactory due to the fact that the erased area often has little bearing with respect to the location of the eraser on the touch sensitive panel. Also, this technique does not allow part of an annotation represented by an object to be erased.

Another technique, currently implemented by the SMART Board, describes the size and shape of the eraser as a circular mask. When the eraser contacts annotations displayed on the touch sensitive panel that are represented by an object, the parts of the annotations within the circular mask are removed. During movement of the eraser, the mask is repeatedly applied to the object to erase the appropriate parts of the annotations represented by the object. Unfortunately, these erase operations require a significant amount of time to complete and therefore, the eraser may move a large distance during the time a single erase operation is performed. As a result, the mask is applied to the object at spaced locations resulting in disjointed parts of annotations being removed instead of a continuous swatch representing the eraser stroke. It is possible to save the intermediate eraser positions and apply the mask retroactively; however, this results in the erase operations falling further and further behind the actual eraser position. Accordingly, improvements to erase operations in electronic writeboards are desired.

It is therefore an object of the present invention to provide a novel method and editor for erasing on an electronic writeboard.

SUMMARY OF THE INVENTION

According to one aspect of the present invention there is provided a method for erasing objects representing writing on an electronic writeboard comprising the steps of:

describing an eraser as a mask;

monitoring movement of said eraser over said electronic writeboard;

detecting overlap between said mask and writing on said electronic writeboard represented as an object and erasing writing within said mask; and adjusting the shape of said mask to compensate for the speed at which said eraser is moved over said electronic writeboard.

Preferably, movement of the eraser is detected at intervals and the shape of the mask is adjusted when the distance traveled by the eraser between successive eraser events exceeds a threshold. It is also preferred that at the adjusting step, the mask is changed from a generally circular configuration to a generally rectangular configuration when the eraser is moved over the electronic writeboard at a speed above a threshold rate. In a preferred embodiment, the threshold rate is determined by measuring the distance between two contact points of the eraser on the electronic writeboard after a predetermined amount of time has elapsed.

Preferably, the size and shape of the rectangular mask is calculated by extending line segments from the eraser contact points in opposite directions and perpendicular to a line joining the eraser contact points. The line segments have a length equal to the radius of the circular mask. The ends of the line segments define the corners of the rectangular mask.

According to another aspect of the present invention there is provided an editor for removing writing on an electronic writeboard represented as an object comprising:

means for describing an eraser as a mask;

means for monitoring movement of said eraser over said electronic writeboard;

means for detecting overlap between said mask and writing on said electronic writeboard represented as an object and erasing writing within said mask; and means for adjusting the shape of said mask to compensate for the speed at which said eraser is moved over said electronic writeboard.

According to yet another aspect of the present invention there is provided an interactive display system comprising:

a touch sensitive panel responsive to user contact in the form of writing and erasing and generating signals representing the location of writing and erasing thereon;

a projector to project images on said touch sensitive panel reflecting the writing and erasing on said touch sensitive panel; and a computer executing an applications program, said applications program being responsive to writing signals to create objects representing writing on said touch sensitive panel and providing updated image output to said projector, said applications program also being responsive to erasing signals and including means for describing an eraser as a mask; means for monitoring movement of the eraser over said touch sensitive panel; means for detecting overlap between the mask and writing on said touch sensitive panel and erasing writing within said mask; and means for adjusting the shape of said mask to compensate for the speed at which said eraser is moved over said touch sensitive panel, said applications program providing updated image output to said projector to reflect erasing of writing on said touch sensitive panel.

According to still yet another aspect of the present invention there is provided a computer readable medium including computer program code for erasing writing on an electronic writeboard, said computer readable medium comprising:

computer program code for describing an eraser as a mask;

computer program code for monitoring movement of said eraser over said electronic writeboard;

computer program code for detecting overlap between said mask and writing on said electronic writeboard and erasing writing within said mask; and computer program code for adjusting the shape of the mask to compensate for the speed at which said eraser is moved over said electronic writeboard.

The present invention provides advantages in that movement of the eraser over writing on the electronic writeboard results in the writing being removed quickly and continuously. This is achieved by altering the shape of the eraser mask to compensate for the speed at which the eraser is moved across the electronic writeboard.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
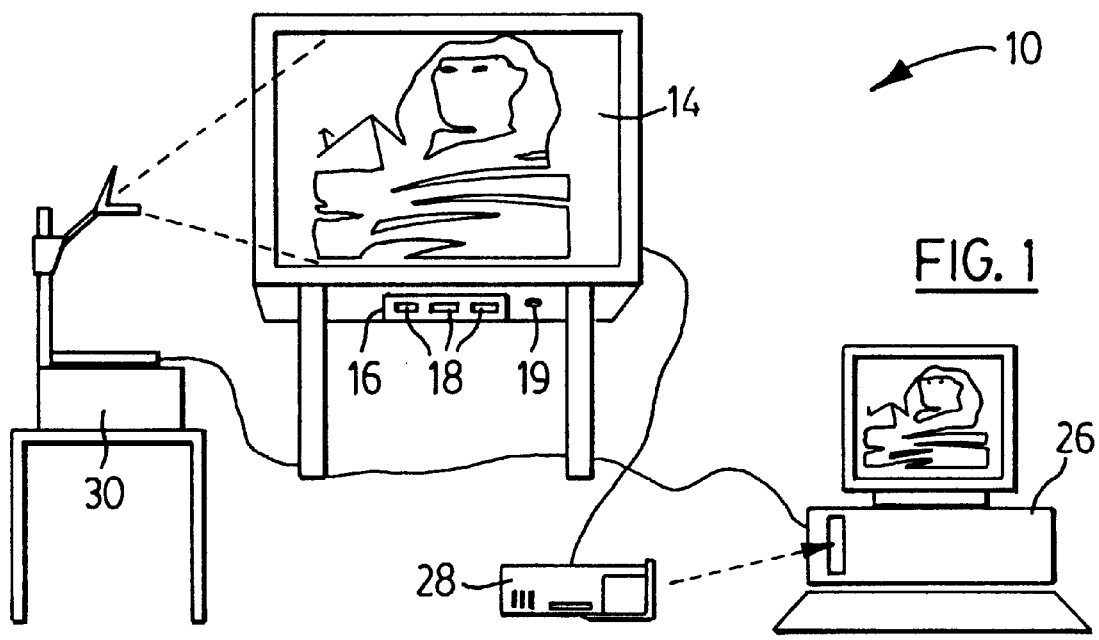
FIG. 1 is schematic diagram of an interactive display system including a touch sensitive panel.
Figure 2:
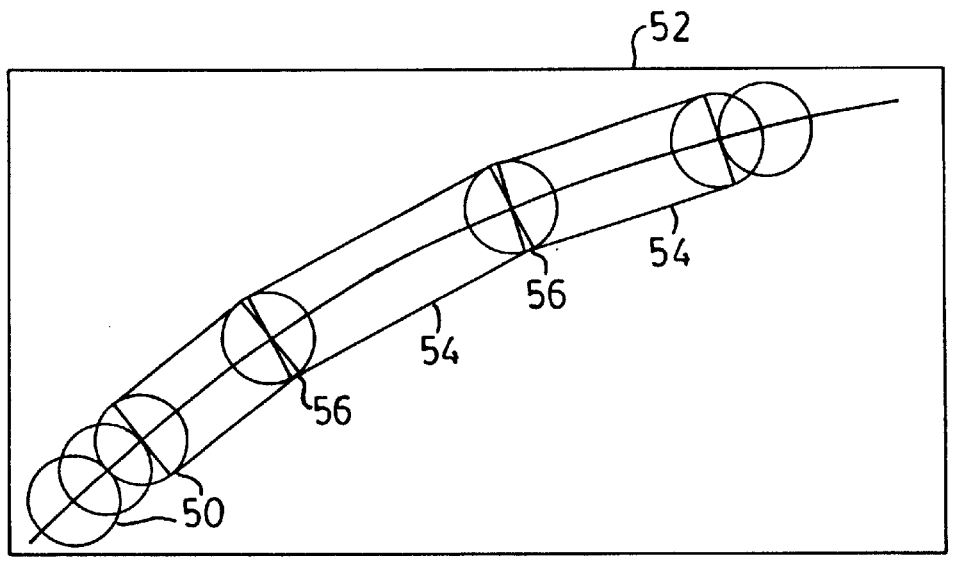
FIG. 2 is an illustration showing eraser mask configurations.
Figure 3:
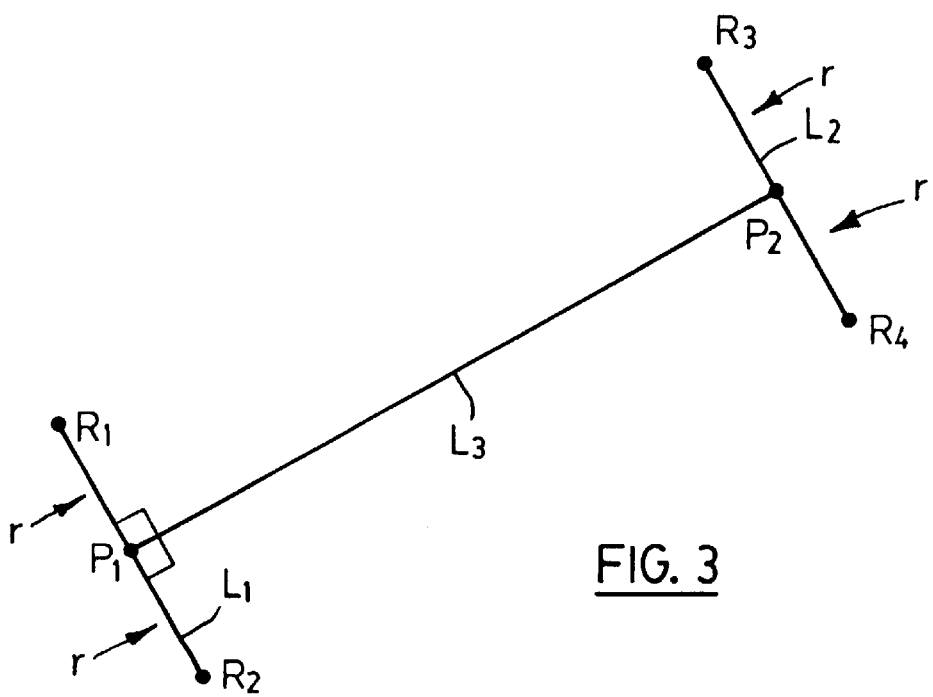
FIG. 3 is an illustration showing calculation of a rectangular eraser mask.

Referring now to FIG. 1, an interactive display system similar to that disclosed in U.S. Pat. No. 5,448,263 to Martin is shown and is generally indicated to by reference numeral 10. As can be seen, interactive display system 10 includes an electronic writeboard 12 (EWB) of the type manufactured by SMART Technologies Inc. under model No. SB360 and sold under the name SMART Board. The SMART Board 12 includes a touch sensitive panel 14 and a tool tray 16 accommodating a plurality of tools 18 and having at least one user selectable button 19. The tools 18 include a number of colored pens and an eraser. A controller 28 having memory is installed in a slot of a personal computer 26 and executes a controller application to control the overall operation of the SMART Board 12. A driver in the form of an application is executed by the personal computer 26 and translates serial data from the controller 28 into events such as mouse events, tool change events and button press events.

The personal computer 26 is connected to a liquid crystal display panel 30 positioned on an overhead projector 32 so that the screen image presented on the monitor of the personal computer is projected onto the touch sensitive panel 14. As will be appreciated, the touch sensitive panel can be placed in front of a rear projection system or alternatively, the projector 32 and touch sensitive panel can be integrated into a single unit.

When the electronic writeboard 12 and the personal computer 26 are connected and initialized, the electronic writeboard driver registers with the writeboard applications software executed by the personal computer. During this registration process, the driver determines the messages to which the applications software responds. Once the registration process has been completed, events generated by the SMART Board as a result of user contact with the touch sensitive panel, selection of a tool, pressing of a button etc. are sent to the applications software.

If the applications software is not "aware" of the SMART Board 12 such as Microsoft NetMeeting® software (i.e. the applications software does not use the SMART Board as the SDK source code), the personal computer 26 executes Aware interface software to interface the SMART Board 12 and the applications software. Specifics of the Aware interface software are described in pending U.S. application Ser. No. 08/962,039 filed on Oct. 31, 1997 and assigned to the assignee of the present invention, the contents of which are incorporated herein by reference.

In the projected mark-up mode, when a tool 18 is used to write on the touch sensitive panel 14, the applications software tracks where writing and erasing on the touch sensitive panel has occurred and provides image output to the projector 30 so that the images projected onto the touch sensitive panel 14 are updated to reflect writing and erasing. The applications software generates objects representing the writing and stores the objects on pages allowing the objects to be moved, sized and otherwise manipulated in a conventional manner. The manner in which the writing is stored as objects is described in Applicant's co-pending application filed on even date entitled "Method For Editing Objects Representing Writing On An Electronic Writeboard", the contents of which are incorporated by reference.

When it is desired to erase writing represented by an object that is displayed on the touch sensitive panel 14, the eraser is used and is moved across the touch sensitive panel over the writing to be erased. The applications software tracks movement of the eraser and describes the eraser as a mask whose shape is adjusted to compensate for the speed at which the eraser is moved across the touch sensitive panel 14. When the eraser is moving slowly, the applications software uses a circular mask to describe the eraser. When the eraser is moving quickly, the applications software uses a rectangular mask to describe the eraser. The applications software applies the masks to the objects. Writing within the masks is removed from the objects and the image output provided to the projector 30 is updated accordingly. Further specifics concerning the manner in which the applications software adjusts the shape of the mask used to describe the eraser will now be described with particular reference to FIGS. 2 to 4c.

When an eraser event occurs by bringing the eraser into contact with the touch sensitive panel 14, the applications software applies a circular mask 50 to the drawing area onto which the touch sensitive panel is mapped. If the circular mask 50 contacts an object 52, writing represented by the object that is within the circular mask is removed and the current time and contact position of the eraser on the touch sensitive panel 14 is stored. As the eraser is moved, additional contact points of the eraser on the touch sensitive panel 14 are ignored until a threshold amount of time, in this case 75 ms, has elapsed. This is done to inhibit clustering, a situation where eraser contact points in very close proximity are processed causing the processor to bog down. By introducing this gap between processing of eraser events, processed eraser contact points are generally evenly spaced.

When a successive eraser event occurs after the threshold amount of time has elapsed, the distance between the successive eraser contact points is compared with a threshold value equal to the radius of the circular mask. If the distance between the eraser contact points is less than or equal to the threshold value, the circular mask is used to describe the eraser at this successive eraser contact position. Writing represented by an object within the circular mask is removed and the current time and contact position of the eraser on the touch sensitive panel 14 is stored. This process is performed as long as the distance between successive eraser contact points is less than or equal to the threshold value.

However, if the distance between successive eraser contact points is greater than the threshold value, a rectangular mask 54 which extends from the last contact point to the current eraser contact point is used to describe the eraser. A circular mask 56 is used at the end of the rectangular mask 54. This avoids gaps from occurring as a result of overlapping rectangular masks if the direction of movement of the eraser on the touch sensitive panel 14 changes rapidly. The size and shape of the rectangular mask is calculated by considering line segments L1 and L2 that are perpendicular to a line L3 extending between successive eraser contact points P1 and P2 (see FIG. 3). The line segments L1 and L2 have lengths equal to the radius of the circular mask and extend in opposite directions. The ends R1 to R4 of the line segments L1 and L2 define the four corners of the rectangular mask 54.

Once the rectangular mask has been determined, the rectangular mask is applied to the object. Writing represented by the object that is within the rectangular mask is removed. During this process, each line segment in the object is compared against the rectangular mask. If a line segment is entirely within the mask by checking if its end points are within the mask, it is removed. Otherwise, the intersection points IP between the line segments and the boundary B of the rectangular mask 54 are calculated. Once all of the intersection points have been calculated, the line segments are broken into smaller pieces by splitting the line segments at the intersection points. The resulting smaller line segments are either entirely inside or outside of the rectangular mask 54. Line segments entirely within the mask are removed. This process is performed for all line segments within the rectangular mask.

Figure 4A:
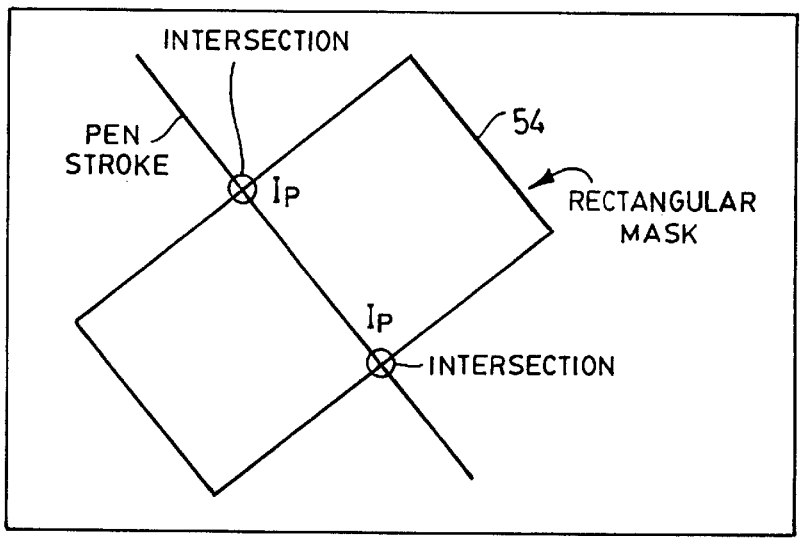
FIGS. 4a to 4c are illustrations showing the steps performed when erasing writing represented as an object that is displayed on the touch sensitive panel forming part of the interactive display system of FIG. 1.
Figure 4B:
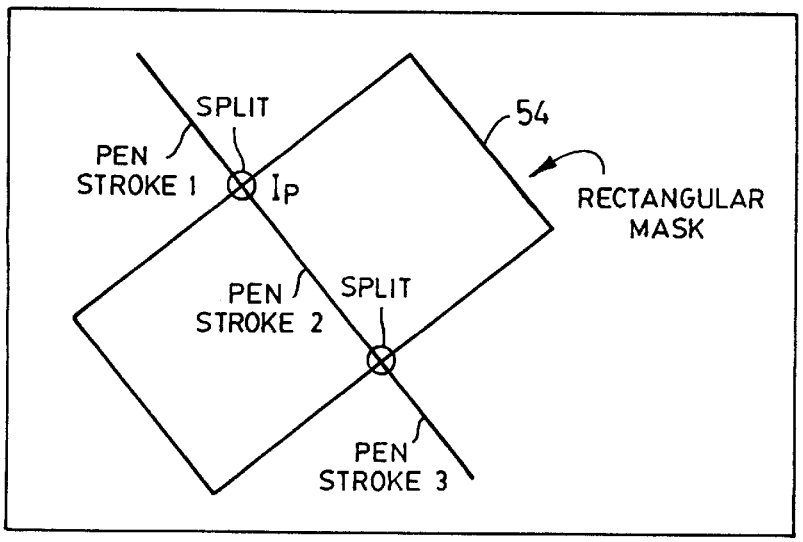
Figure 4C:
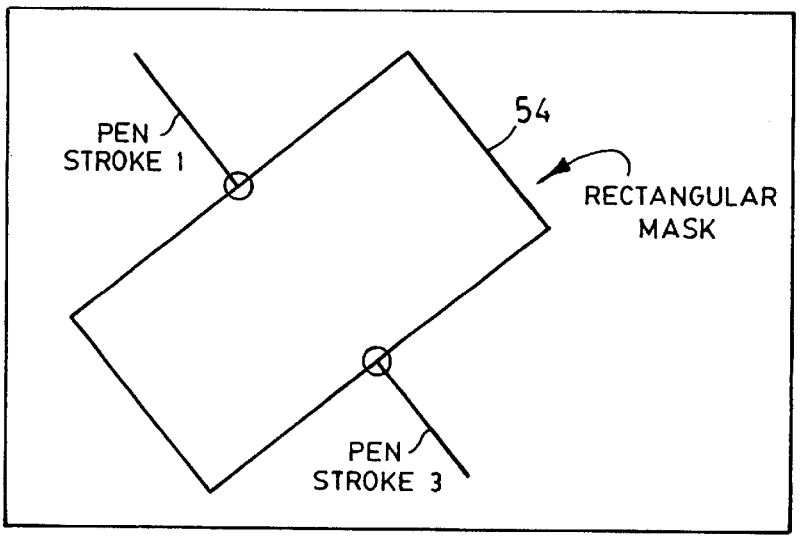

Once an erasing operation is completed, the applications software creates a new object including only the remaining writing that is outside of the eraser mask. This process is repeated as the eraser is moved across the touch sensitive panel 14 and eraser events are generated. FIGS. 4a to 4c illustrate the manner in which the rectangular mask is applied to line segments represented by an object. Appendix A is psuedo-code representing the above-described steps.

Although the threshold value has been described as being equal to the radius of the circular mask, those of skill in the art will appreciate that the threshold value may be eliminated or changed to suit the particular application. Also, although the erasing method has been described for use in an interactive display system, the erasing method can be used in virtually any writeboard or a whiteboard environment where writing on the whiteboard is recorded by a processor and stored as objects.

The present invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices. The computer readable medium can also be distributed over a network computer system.

Although a preferred embodiment of the present invention has been described, those of skill in the art will appreciate that variations and modifications may be made without departing from the spirit and scope thereof as defined by the appended claims.

APPENDIX A

```
STRUCTURE ERASERMESSAGE
{
    POINT eraserPoint;
    ERASEREVENT eventType;      //ERASER_UP, ERASER_DOWN,
ERASER_MOVE
}
FUNCTION EraseAnArea(POINT eraserStartingPoint)
{
```

APPENDIX A-continued

```
    TIME timeLastPoint=GetSystemTime();
    //Save the current eraser location
    POINT lastEraserPoint=eraserStartingPoint;
    //Erase a circle at the current location
    ClipPageAnnotationsAgainstCircularStamp(lastEraserPoint);
loop:
    ERASERMESSAGE nextMessage=GetEraserMessage;
    //check for a distance threshold on the moves to prevent clustering. Don't do this on the last
    //message though because we won't get another chance after that one.
    if (nextMessage.eventType!=ERASER_UP)
    {
      //Avoid clustering by making sure sufficient time has passed since the last point
      TIME timeNewPoint=GetSystemTime();
      //enforce a minimum 75 millisecond delay in this example
      if (timeNewPoint-timeFirstPpoint<75)
      {
        goto loop;
      }
    }
    //OK, we want to erase, at the new point. Figure out which stamp to use.
    INTEGER Distance=DistanceBetweenPoints(nextMessage.eraserPoint,lastEraserPoint);
    //update our previous point time before we do the erasing
    timeLastPoint=GetSystemTime();
    if(Distance>ERASER_RADIUS)
    {
      EraseRectangularStamp(nextMessage.eraserPoint,lastEraserPoint);
    }
    else
    {
      ClipPageAnnotationsAgainstCircularStamp(nextMessage.eraserPoint)
    }
    //update our previous position
    lastEraserPoint=nextMessage.eraserPoint;
    //Get the next point unless we are now finished
    if (nextMessage.eventType!=ERASER_UP)
    {
      goto loop;
    }
  }
  //Given two points, erases a rectangular area between them
  FUNCTION EraseRectangularStamp(POINT ptOne,POINT ptTwo)
  {
    //Use standard trigonometry to calculate the sine and cosine of the line between the two points.
      float hypotenuse=squareroot((ptOne.x-ptTwo.x)*(ptOne.x-ptTwo.x)+
          (ptOne.y-ptTwo.y)*(ptOne.y-ptTwo.y)));
      float sine=(ptOne.x-ptTwo.x)/hypotenuse;
      float cosine=(ptOne.y-ptTwo.y)/hypotenuse;
      //calculate a line segment of length eraser RADIUS tangential to the line between the two points.
      fEraserX=ERASER_RADIUS*cosine;
      fEraserY=ERASER_RADIUS*sine;
      POINT corners[4];
      //Add and subtract this line segment from the first point to get one half of the rectangle
      ptArray[1].x=(ptOne.x)+fEraserX;
      ptArray[1].y=(ptOne.y)-fEraserY;
      ptArray[2].x=(ptOne.x)-fEraserX;
      ptArray[2].y=(ptOne.y)+fEraserY;
      //Add and subtract this line segment from the second point to get the second half of the rectangle
      ptArray[3].x=(ptTwo.x)-fEraserX;
      ptArray[3].y=(ptTwo.y)+fEraserY;
      ptArray[4].x=(ptTwo.x)+fEraserX;
      ptArray[4].y=(ptTwo.y)-fEraserY;
      ClipPageAnnotationsAgainstPolygonStamp(ptArray);
}
```

We claim:

1. A method for erasing writing on an electronic writeboard comprising the steps of:

describing an eraser as a mask;

monitoring movement of said eraser over said electronic writeboard;

detecting overlap between said mask and writing on said electronic writeboard and erasing writing within said mask; and adjusting the shape of said mask to compensate for the speed at which said eraser is moved over said electronic writeboard.

2. The method of claim 1 wherein movement of said eraser is detected at intervals and wherein the shape of said mask is adjusted when the distance between successive eraser events exceeds a threshold value.

3. The method of claim 1 wherein at said adjusting step said mask is changed from a generally circular configuration to a generally rectangular configuration when said eraser is moved over said electronic writeboard at a speed above a threshold rate.

4. The method of claim 3 wherein said threshold rate is determined by measuring the distance between two contact points of said eraser on said electronic writeboard after a predetermined amount of time has elapsed.

5. The method of claim 4 wherein said predetermined amount of time is equal to at least 75 ms.

6. The method of claim 4 wherein the size and shape of said rectangular mask is calculated by extending line segments from the contact points in opposite directions and perpendicular to a line joining said contact points, said line segments having a length equal to the radius of said circular mask, the ends of said line segments defining the corners of said rectangular mask.

7. The method of claim 6 wherein during said erasing, writing constituted by line segments entirely within said mask is removed.

8. The method of claim 7 wherein intersection points between writing constituted by line segments intersecting boundaries of said rectangular mask are detected, said line segments being broken into smaller line segments, smaller line segments entirely within said mask being removed.

9. An editor for erasing writing on an electronic writeboard comprising:

means for describing an eraser as a mask;

means for monitoring movement of said eraser over said electronic writeboard;

means for detecting overlap between said mask and writing on said electronic writeboard and erasing writing within said mask; and means for adjusting the shape of said mask to compensate for the speed at which said eraser is moved over said electronic writeboard.

10. An interactive display system comprising:

a touch sensitive panel responsive to user contact in the form of writing and erasing and generating signals representing the location of writing and erasing thereon;

a projector to project images on said touch sensitive panel reflecting the writing and erasing on said touch sensitive panel; and a computer executing an applications program, said applications program being responsive to writing signals to create objects representing writing on said touch sensitive panel and providing updated image output to said projector to reflect said writing, said applications program also being responsive to erasing signals and including means for describing an eraser as a mask; means for monitoring movement of the eraser over said touch sensitive panel; means for detecting overlap between the mask and writing on said touch sensitive panel and erasing writing within said mask; and means for adjusting the shape of said mask to compensate for the speed at which said eraser is moved over said touch sensitive panel, said applications program providing updated image output to said projector to reflect erasing of writing on said touch sensitive panel.

11. An interactive display system as defined in claim 10 wherein said applications program detects movement of said eraser at intervals and adjusts the shape of said mask when the distance between successive eraser events exceeds a threshold value.

12. An interactive display system as defined in claim 10 wherein said applications program changes the shape of said mask from a generally circular configuration to a generally rectangular configuration when said eraser is moved over said touch sensitive panel at a speed above a threshold rate.

13. An interactive display system as defined in claim 12 wherein said applications program determines said threshold rate by measuring the distance between two contact points of said eraser on said touch sensitive panel after a predetermined amount of time has elapsed.

14. An interactive display system as defined in claim 13 wherein said applications program calculates said rectangular mask by extending line segments from the eraser contact points in opposite directions and perpendicular to a line joining said contact points, said line segments having a length equal to the radius of said circular mask, the ends of said line segments defining the corners of said rectangular mask.

15. An interactive display system as defined in claim 14 wherein said applications program removes writing constituted by line segments entirely within said mask.

16. A computer readable medium including computer program code for erasing writing on an electronic writeboard, said computer readable medium comprising:

computer program code for describing an eraser as a mask;

computer program code for monitoring movement of said eraser over said electronic writeboard;

computer program code for detecting overlap between said mask and writing on said electronic writeboard and erasing writing within said mask; and computer program code for adjusting the shape of the mask to compensate for the speed at which said eraser is moved over said electronic writeboard.

17. A computer readable medium as defined in claim 16 wherein the computer program code for adjusting the shape of the mask changes the mask from a generally circular configuration to a generally rectangular configuration when the eraser is moved over the electronic writeboard at a speed above a threshold rate.

* * * * *